B. O. BEADLE.
NON-SKID DEVICE.
APPLICATION FILED NOV. 30, 1917.
1,301,535. Patented Apr. 22, 1919.
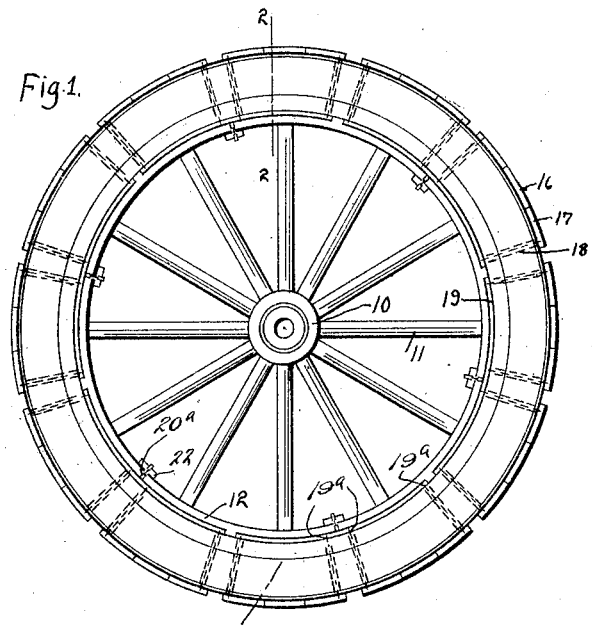
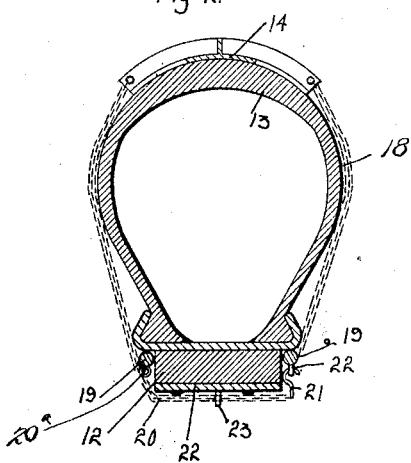
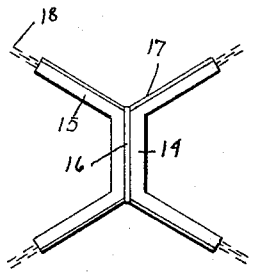
Witness
E. H. Buchanan
Inventor
B. O. Beadle.
By Orwig & Bain Attys.

UNITED STATES PATENT OFFICE.

BAILEY O. BEADLE, OF BEACONSFIELD, IOWA.

NON-SKID DEVICE.

1,301,535. Specification of Letters Patent. Patented Apr. 22, 1919.

Application filed November 30, 1917. Serial No. 204,792.

*To all whom it may concern:*

Be it known that I, BAILEY O. BEADLE, a citizen of the United States, and resident of Beaconsfield, in the county of Ringgold and State of Iowa, have invented a certain new and useful Non-Skid Device, of which the following is a specification.

The object of my invention is to provide a non-skid device of simple, durable and inexpensive construction.

A further object is to provide a non-skid device comprising a series of separate units, said units being connected preferably in pairs, each pair being connected by flexible devices to rigid members at the side of the wheel, which rigid members are secured to the wheel.

With these and other objects in view my invention consists in the construction, arrangement and combination of the various parts of the device, whereby the objects contemplated are attained, as hereinafter more fully set forth, pointed out in my claim, and illustrated in the accompanying drawings, in which:

Figure 1 shows a side elevation of an automobile wheel equipped with a non-skid device embodying my invention.

Fig. 2 shows a sectional view taken on the line 2—2 of Fig. 1; and

Fig. 3 shows a plan view of the gripping portion of one of the units.

In the illustration of my invention shown in the accompanying drawings, I have used the reference numeral 10 to indicate generally the hub of a wheel having the spokes 11, the felly 12 and the pneumatic tire 13.

My improved non-skid device consists of a plurality of units arranged and connected in pairs in the manner hereinafter described. Each unit comprises a plate 14 designed to rest on the central tread portion of the tire. These plates are longer than they are wide, and in the lines of their greater length extend circumferentially of the wheel. Each plate has at each end a V-shaped extension 15 having diverging arms, as illustrated in Fig. 3. Each plate 15 has a central, outwardly extending rib 16. The arms of the extensions 15 are also provided with outwardly extending ribs 17 at their edges, as shown in Fig. 3.

Secured to the outer end of each arm of each extension 15 is a short chain 18 extending around the side of the wheel toward the felly.

The chain of each adjacent connected pair of units on each side of the wheel are secured to a rod 19, as illustrated in Fig. 1.

In the drawings I have illustrated the device in which six pairs of said units are employed and there are six rods 19 on each side of the wheel. It will thus appear that the units are connected in pairs. Each pair of units is connected on each side of the wheel by means of the chains 18 with one of the rods 19. The pair of rods connected with each pair of units is secured to the wheel in the following manner.

Connecting each pair of rods on opposite sides of the wheel is a chain 20.

Secured to the felly at proper intervals are plates 22, each having a central, inwardly, extending pin or the like 23, which pin when the parts are installed on the wheel, is designed to extend through one of the links of the adjacent chain 20 for holding said chain against movement circumferentially of the wheel or laterally. As many of the units may be used as are necessary for the purpose.

It will be noted that the units are so arranged that in the rotation of the wheel especially in soft ground or on slippery or frozen surfaces or in snow, the ribs 17 will grip the ground and increase the traction pull on the wheel. Sidewise skidding is prevented by engagement of the ribs 17 with the ground and also by engagement of the ribs 16 with the ground.

It will thus be seen that more rib surface is available for preventing sidewise skidding than for traction, and I consider this one of the important features of my device.

The plates 14 and their extensions 15 are fitted to the surface of the tire and have sufficient area to prevent their cutting into the tire, and yet are not large enough to heat the tire nor retain between them and the tire pebbles or the like.

It will be noted that the units, on account of the flexibility of the chains 18, are permitted certain limited circumferential movement of the wheel, but cannot travel around the wheel. Thus the wear on any one spot is reduced and the device is self-cleaning in removing mud, sand or the like, while always ready to grip the ground for traction. By connecting the units in pairs to the rods 19 as many of the units may be readily and easily installed on the wheel as desired, and yet only a minimum amount of fastening devices is required.

One chain 20 suffices for securing two of the units to the wheel. I thus secure the advantage of being able to use as many or as few of the units as is desired.

If one of the units becomes worn another pair of units may be readily substituted without throwing away the units for the entire wheel.

The units may be placed on the upper portion of the wheel and the wheel may then be rotated while placing the units on the rest of the wheel without the necessity of getting into the mud.

Some changes may be made in the construction and arrangement of the parts of my improved non-skid device without departing from the essential features and purposes of my device, and it is my intention to cover by my claim any modified forms of structure or use of mechanical equivalents, which may be reasonably included within the scope of my claim.

I claim as my invention:

In a non-skid device, a series of plates each comprising a body portion longer than it is wide and having its line of greater length extending circumferentially of the wheel, each of said body portions having at each end a V-shaped extension, with diverging arms, as illustrated, said body portions and arms each having an outwardly extending rib, whereby there is provided a traction device having more rib surface available for preventing sidewise skidding, than for traction, and means for securing said plates successively circumferentially on the tire.

Des Moines, Iowa, November 19, 1917.

BAILEY O. BEADLE.

Copies of this patent may be obtained for five cents each, by addressing the "Commissioner of Patents, Washington, D. C."